(12) United States Patent
Adcock et al.

(10) Patent No.: US 11,465,752 B2
(45) Date of Patent: Oct. 11, 2022

(54) SEAT ASSEMBLY WITH HYBRID SPRING-BASED CUSHION SUPPORT

(71) Applicant: B/E Aerospace, Inc., Winston-Salem, NC (US)

(72) Inventors: Christopher Adcock, Advance, NC (US); Ryan J. Suhre, Winston-Salem, NC (US); Stephen A. Puglisi, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 81 days.

(21) Appl. No.: 17/068,581

(22) Filed: Oct. 12, 2020

(65) Prior Publication Data

US 2022/0111966 A1  Apr. 14, 2022

(51) Int. Cl.
  *B60N 2/70* (2006.01)
  *B64D 11/06* (2006.01)
  *A47C 7/18* (2006.01)
  *A47C 7/30* (2006.01)

(52) U.S. Cl.
  CPC ............ *B64D 11/0647* (2014.12); *A47C 7/18* (2013.01); *A47C 7/30* (2013.01); *B60N 2/70* (2013.01); *B60N 2/7094* (2013.01)

(58) Field of Classification Search
  CPC .............. B64D 11/0647; B64D 11/064; B64D 11/0649; B64D 11/06; B60N 2/7094; B60N 2/70; B60N 2/7005; A47C 7/30
  See application file for complete search history.

(56) References Cited

U.S. PATENT DOCUMENTS

| | | | | |
|---|---|---|---|---|
| 3,156,461 | A | * 11/1964 | Caughey | A47C 7/30 5/260 |
| 3,169,795 | A | * 2/1965 | Flint | A47C 1/032 297/309 |
| 3,556,505 | A | 1/1971 | Ohta et al. | |

(Continued)

FOREIGN PATENT DOCUMENTS

| | | |
|---|---|---|
| CN | 104325910 A | 2/2015 |
| DE | 2361010 B2 | 10/1975 |

(Continued)

OTHER PUBLICATIONS

Extended Search Report in European Application No. 21202080.4 dated Feb. 18, 2022, 7 pages.

*Primary Examiner* — Syed A Islam
(74) *Attorney, Agent, or Firm* — Suiter Swantz pc llo (57) ABSTRACT

A seat assembly configured to be employed in vehicle seats such as aircraft passenger seats. The seat assembly includes a seat frame having first and second spaced frame members and first and second spaced transverse beams. A plurality of springs positioned proximate an aft end of the seat frame generally above the second transverse beam span between the first and second frame members. A support member is attached to the plurality of springs and to a seat back attachable to the seat frame. A cushion assembly mounts on the seat frame such that the aft end rests on the plurality of springs while the forward end rests on the front transverse beam. In use, as the aft end of the cushion assembly deflects downward toward the second transverse beam the forward end simultaneously rotates around the first transverse beam.

13 Claims, 9 Drawing Sheets

(56) References Cited

U.S. PATENT DOCUMENTS

| | | | |
|---|---|---|---|
| 5,971,432 A | 10/1999 | Gagnon et al. | |
| 7,699,400 B2 * | 4/2010 | Speh | B64D 11/0649 |
| | | | 297/452.18 |
| 10,189,570 B2 | 1/2019 | Hames et al. | |
| 10,669,030 B1 | 6/2020 | Morse et al. | |
| 2019/0009700 A1 | 1/2019 | Hojo | |
| 2019/0366895 A1 | 12/2019 | Ito | |

FOREIGN PATENT DOCUMENTS

| | | |
|---|---|---|
| JP | 1989001339 B2 | 2/1983 |
| WO | 2014045420 A1 | 3/2014 |
| WO | 2019035394 A1 | 2/2019 |

* cited by examiner

SEAT ASSEMBLY WITH HYBRID SPRING-BASED CUSHION SUPPORT

TECHNICAL FIELD

The subject matter disclosed herein relates generally to vehicle seats, and more particularly to vehicle seats of the type including a spring-based support element.

BACKGROUND

Vehicle seats such as aircraft passenger seats typically include a rigid frame, a support element mounted to the frame, and a seat cushion mounted on the support element. Examples of support elements include spring structures and fabric-based diaphragms. While both types of support elements contribute to the desired comfort and support of the seat, spring structures tend to be complex and heavy, while fabric-based diaphragms tend to stretch and wear-out over time. In addition, both types of support elements are expensive to produce, difficult to install, and time consuming to replace as needed.

Therefore, there is a need for an improved support configuration for a seat cushion that can provide the desired comfort and support without the undesirable complexity, weight and cost of conventional support elements.

SUMMARY

To achieve the foregoing and other advantages, embodiments of the inventive concepts disclosed herein are directed to a seat assembly generally including a seat frame supporting a cushion assembly, wherein the cushion assembly is cooperatively supported at its aft end by a spring-based element and at its forward end by a fixed structural element. In this configuration, the spring-based element is strategically positioned at the aft end of the seat frame corresponding to the aft end of the seat cushion likely to receive the highest point load. This configuration allows the cushion assembly to perform to provide seat comfort and support where the passenger weight is most favored, while obviating the need for heavy and complicated spring-based elements at the forward end of the seat frame.

In some embodiments, the seat assembly includes a seat frame having first and second spaced frame members (e.g., left and right frame members) and first and second spaced transverse beams (e.g., forward and aft transverse beams) spanning between the first and second spaced frame members. A plurality of springs are positioned near the aft end of the seat frame generally above the second transverse beam and span between the first and second frame members. A cushion assembly mounts on the seat frame by resting on the springs located at the aft end of the seat while simultaneously resting on the first transverse beam. In use, the weight of a seat occupant on the aft end of the cushion assembly causes the aft end to deflect downward toward the second transverse beam and the forward end to rotate around the first transverse beam.

In some embodiments, the seat assembly may include a first support for attaching a first end portion of each spring to the first frame member and a second support for attaching a second end portion of each spring to the second frame member.

In some embodiments, the first and second end portions of each spring may extend forward and perpendicular to a direction in which the spring is extensible.

In some embodiments, the first and second end portions of each spring may extend downward and perpendicular to a direction in which the spring is extensible.

In some embodiments, each of the plurality of springs may be a flat pattern sinuous spring.

In some embodiments, the cushion assembly may include a bottom layer of expanded polypropylene structural foam, an intermediate layer of polyethylene foam, and a top layer of polyurethane foam.

In some embodiments, the cushion assembly may include an overhanging portion at the forward end which is positioned forward of the first transverse beam.

In some embodiments, the support member may be constructed of fabric and each spring may be received through a sleeve sewn in the support member, the support member sewn around the springs to capture the springs, or the springs otherwise fastened to the support member.

In some embodiments, the cushion assembly is free of attachment to each of the first frame member, the second frame member, and the second transverse beam.

In some embodiments, the seat assembly is devoid of springs and/or a spring element at or near a forward end of the seat frame.

In one implementation, the seat assembly is employed in an aircraft passenger seat further including a seat back pivotally attached to the seat frame to which the support member attaches.

The seat assemblies according to the present disclosure provide a more comfortable sitting position, softer feel, reduced weight, and increased longevity and durability as compared to conventional spring-based seat assemblies, among other advantages.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

With reference to the drawing figures, the present disclosure provides seat assemblies configured to be employed in vehicle seats, for instance aircraft passenger seats. The seat assemblies disclosed herein generally include a rigid structural element supporting the front of the seat bottom cushion and a spring-based element supporting the back of the seat bottom cushion to provide a 'hybrid' cushion support system.

Referring to FIGS. 1-5, a seat assembly according to the present disclosure is shown generally at reference numeral 100. The seat assembly 100 may be employed in various types of vehicle seats, for instance economy class aircraft passenger seats. The seat assembly 100 generally includes a seat frame 102 supporting a cushion assembly 104. In some embodiments, the seat assembly 100 may be employed at each seat position within a row of seats, wherein certain seat assembly components may be shared with other seats. For example, some frame elements may be shared between adjacent passenger seats while other frame elements may be common across an entire row of seats. Seats may be provided as stand-alone or as part of a two-seat, three-seat, four-seat, or five or more-seat row. In some embodiments, legs (not shown) may attach to the seat frame 102 and secure to embedded seat tracks located in the floor via conventional track fasteners. As shown, a seat back 106 may pivotally attach to the seat frame 102 such that the seat back is configured to selectively pivot between an upright sitting position for taxi, take-off and landing (TTOL) and a reclined sitting position during flight. Other attachments to the seat frame 102 may include pivoting armrests, seatbelt, and tray table support arms, among others.

The seat frame 102 serves to support the cushion assembly 104 and generally includes first and second spaced frame members 108a, 108b, and first and second spaced transverse beams 110a, 110b spanning between the first and second frame members 108a, 108b. In some embodiments, the first and second frame members 108a, 108b are positioned in parallel spaced-apart relationship, the first and second transverse beams 110a, 110b are positioned in parallel spaced-apart relationship, and the first and second transverse beams 110a, 110b are perpendicular to the first and second frame members 108a, 108b. In some embodiments, the first and second frame members 108a, 108b may correspond to respective 'left' and 'right' seat spreaders, and the first and second transverse beams 110a, 110b may correspond to respective 'forward' and 'aft' structural beam tubes, as known to those skilled in the art of aircraft passenger seat constructions. In some embodiments, the first and second transverse beams 110a, 110b may be tubular and may be received through respective first and second openings provided through the first and second frame members 108a, 108b.

A plurality of springs 112 are positioned at or near the aft end of the seat frame 102 corresponding to the aft end of the cushion assembly 104 when installed upon the seat frame 102. Each spring 112 spans between the first and second frame members 108a, 108b. The springs 112 are positioned generally at or near the aft end of the seat frame 102 and in spaced-apart relation above the second transverse beam 110b such that spring-based support is provided at the aft end of the cushion assembly 104 where the passenger weight is likely favored.

In some embodiments, the first and second frame members 108a, 108b support individual springs 112. In other embodiments, the springs 112 may be interconnected or provided as part of an integrated spring assembly. As shown, each one of the individual springs 112 is a flat pattern sinuous spring, although other springs shapes and types may be employed. Each spring 112 has a first end connected to the inboard side of the first frame member 108a and a second end connected to the inboard side of the second frame members 108b. As such, each spring extends continuously between the first and second frame members 108a, 108b. In some embodiments, the seat assembly 100 includes at least one spring 112, and preferably at least two springs 112. As shown, three identical springs 112 are positioned coplanar and in parallel spaced-apart relationship. The spacing between the individual springs 112, as well as the position of the springs both vertically and horizontally relative to the seat frame 102 and second transverse beam 110b, may be determined, at least in-part, by the configuration of the cushion assembly, desired tilt of the cushion assembly in predetermined sitting positions, and spring rates, among other factors Sitting feel and performance may be customized by modifying one or more of the spring geometry, position and spacing relative to other springs and relative to the seat frame 102.

Figure 1:
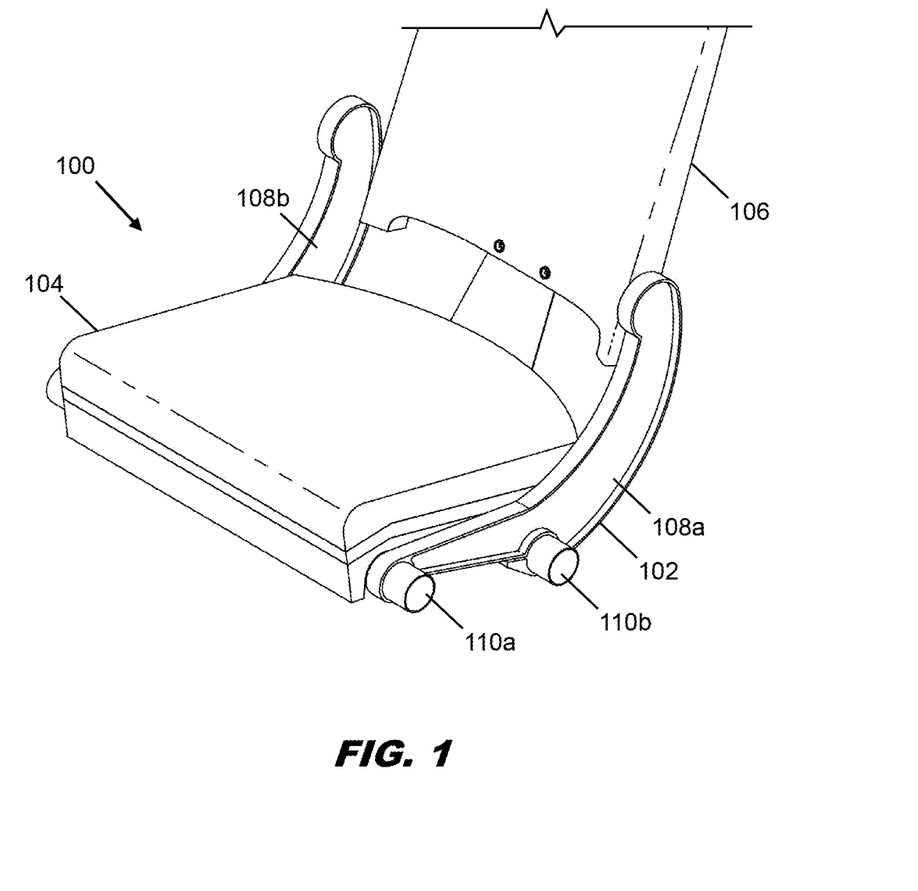
FIG. 1 is a front isometric view of a seat assembly according to the present disclosure.
Figure 2:
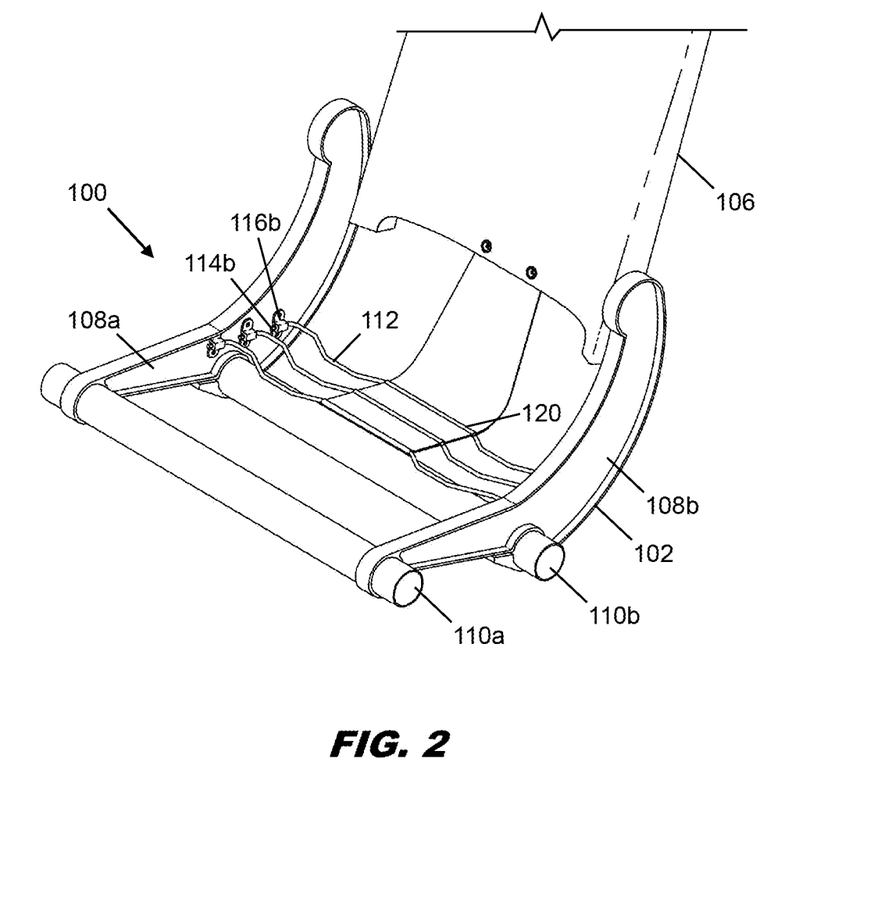
FIG. 2 is a front isometric view of the seat assembly of FIG. 1 shown without the cushion assembly to illustrate a first spring configuration.
Figure 3:
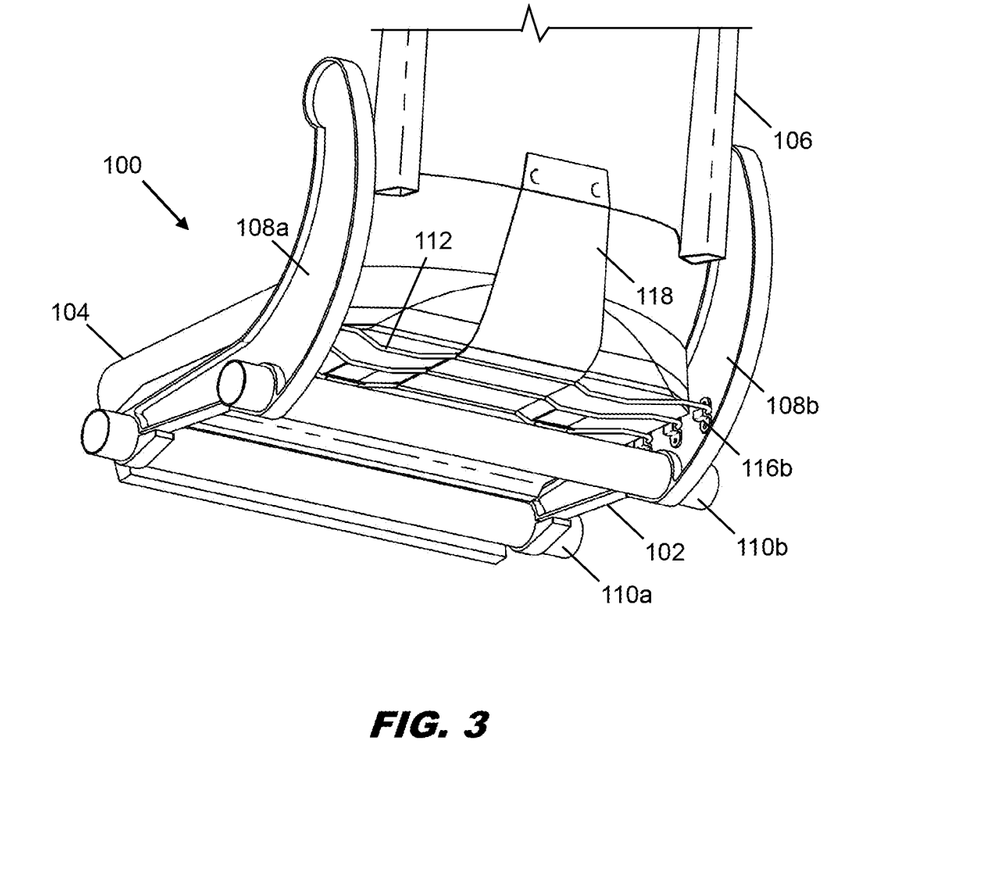
FIG. 3 is a rear isometric view of the seat assembly of FIG. 1 including the first spring configuration.
Figure 4:
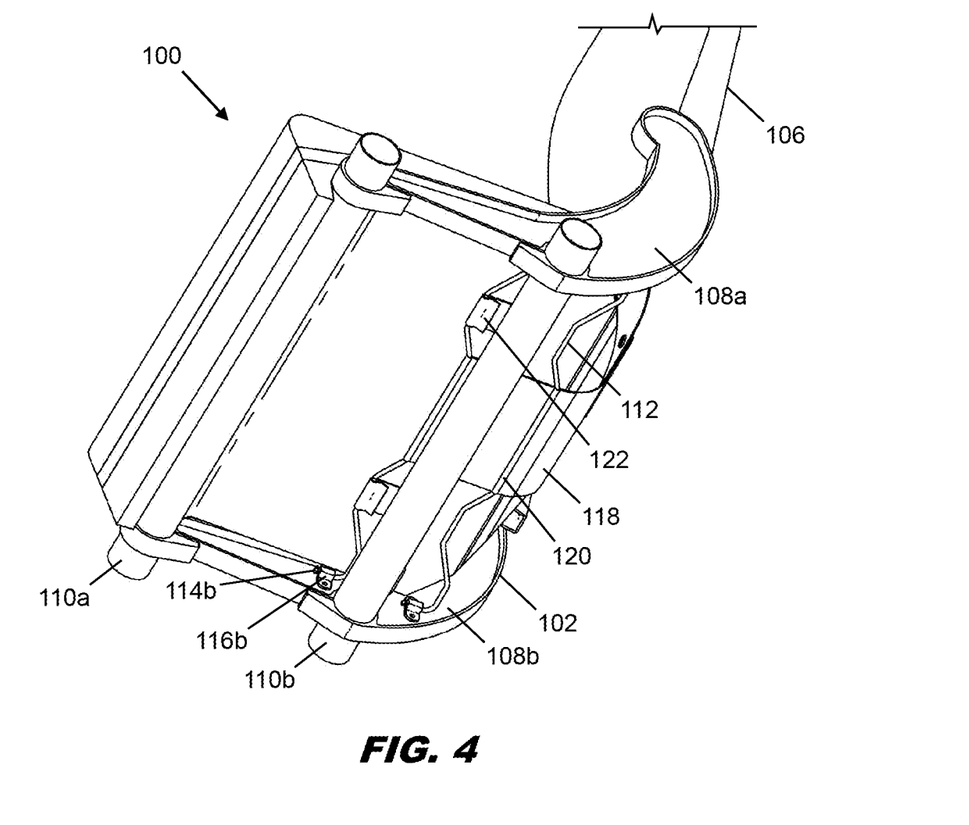
FIG. 4 is a bottom isometric view of the seat assembly of FIG. 1 including the first spring configuration.

As best shown in FIG. 4, each spring 112 has a first end portion 114a and a second end portion 114b, at opposing end, wherein the first and second end portions 114a, 114b extend perpendicularly to the direction in which the spring is extensible. As shown, the first and second end portions 114a, 114b face toward the forward end of the seat frame 102. A first support 116a serves to attach the first end portion 114a of each spring 112 to the first frame member 108a, and a second support 116b serves to attach the second end portion 114b of each spring 112 to the second frame member 108b. For example, the first and second support members 116a, 116b may be brackets, fasteners, or other suitable structure affixed to their respective frame member 108a, 108b. Alternatively, the first and second support members 116a, 116b may be integrally formed with their respective frame member 108a, 108b. As shown, each of the first and second end portions 114a, 114b is rotatably engaged in its respective support such that the end portions can rotate as the springs resiliently deform. The particular sinuous pattern of each spring 112 may be customized to tune the performance of the seat assembly with one performance parameter being to prevent the cushion assembly 104 from bottoming out on the second transverse beam 110b.

A support member 118 or 'tail' serves to interconnect the springs 112 to the seat back 106 and also serves to help support the seat occupant, and in some embodiments, may resist loading on the cushion assembly 104. As shown, the support member 118 attaches at one end to each of the individual springs 112 and is attachable at the opposing end to the seat back 106. In some embodiments, the support member 118 may be constructed from fabric and may be sewn around one or more of the springs 112. In some embodiments, the support member 118 may be sewn to include a sleeve 120 for receiving each spring 112. In some embodiments, the support member 118 may further attach to the second transverse beam 110b, or other structural member, to further couple the various members into a cohesive system. In some embodiments, the support member 118 may be made of flexible plastic or rubber co-molded to the springs with the remaining fabric also co-molded or otherwise attached to the plastic or rubber and then attached to the corresponding seat back.

Figure 5:
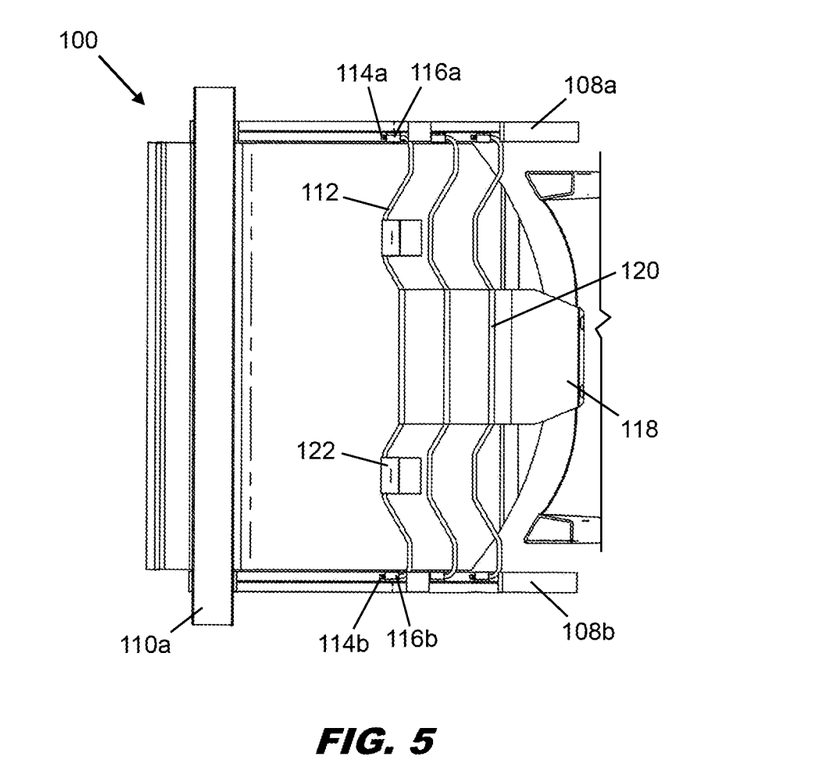
FIG. 5 is a bottom plan view of the seat assembly of FIG. 1 including the first spring configuration.

As best shown in FIG. 5, attachment clips 122 may serve to positionally locate and secure in place the cushion assembly 104 relative to the seat frame 102 and springs 112. In some embodiments, the attachment clips 122 may be affixed to the seat dress cover (not shown) or directly to the cushion assembly 104. Each attachment clip 122 may be constructed from bent metal or molded plastic and may have a first end configured to capture around a spring 112 and a second end sewn or otherwise fastened to the dress cover or bottom of the cushion assembly. Known to those skilled in the art of seat construction, the dress cover may be configured to fit over at least a portion of the cushion assembly 104. The dress cover and cushion assembly 104, and also the cushion assembly 104 or dress cover and the support member 118, may be coupled together with one or more suitable fasteners such as hook and loop fastener assemblies (e.g., Velcro®). Fastener assemblies other than attachment clips may also be used to positionally located and secure the cushion assembly 104 in place.

Figure 6:
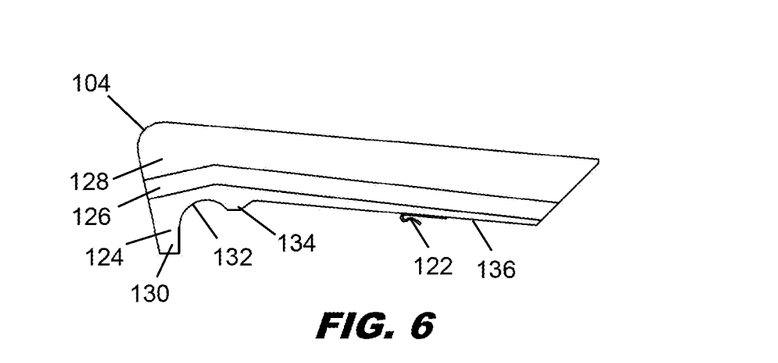
FIG. 6 is an elevation view of a cushion assembly according to the present disclosure.

Referring to FIG. 6, a non-limiting example of a cushion assembly 104 according to the present disclosure includes three distinct layers including a bottom layer 124, a middle layer 126, and a top layer 128 coupled together to provide an integrated assembly. In some embodiments, the bottom layer 124 may include expanded polypropylene structural foam or the like, the middle layer 126 may include polyethylene intermediate foam or the like, and the top layer 128 may include polyurethane foam or the like for comfort. Additional layers provided above, below or between the aforementioned bottom, middle and top layers 124, 126, 128 may include adhesive layers, insulating layers, and fire-blocking layers, among other layers, provided for performance of the assembly and/or to promote adhesion between layers.

The bottom surface of the bottom layer 124 may be shaped to correspond to the position and spacing of the first and second transverse beams 110a, 110b. As shown, the forward end of the bottom layer 124 defines an overhanging portion 130 which is positioned forward of the first transverse beam 110a when the cushion assembly 104 is installed on the seat frame 102. The overhanging portion 130 transitions toward the aft end into a concave portion 132 having a curvature that corresponds to the convex curvature of the first transverse beam 110a. The corresponding curvatures allow the forward end of the cushion assembly 104 to rotate around the first transverse beam 110a as the aft end of the cushion assembly 104 moves downward. The bottom layer 124 may further define an end to the concave portion 134 to help positionally locate the cushion assembly on the transverse beam 110a, and then lastly transitions into an elongate planar portion 136 which extends to the terminal aft end of the cushion assembly 104. A non-limiting example of an attachment clip position is shown for locating and securing in place the cushion assembly 104 relative to the seat frame 102 and springs 112.

Figure 7:
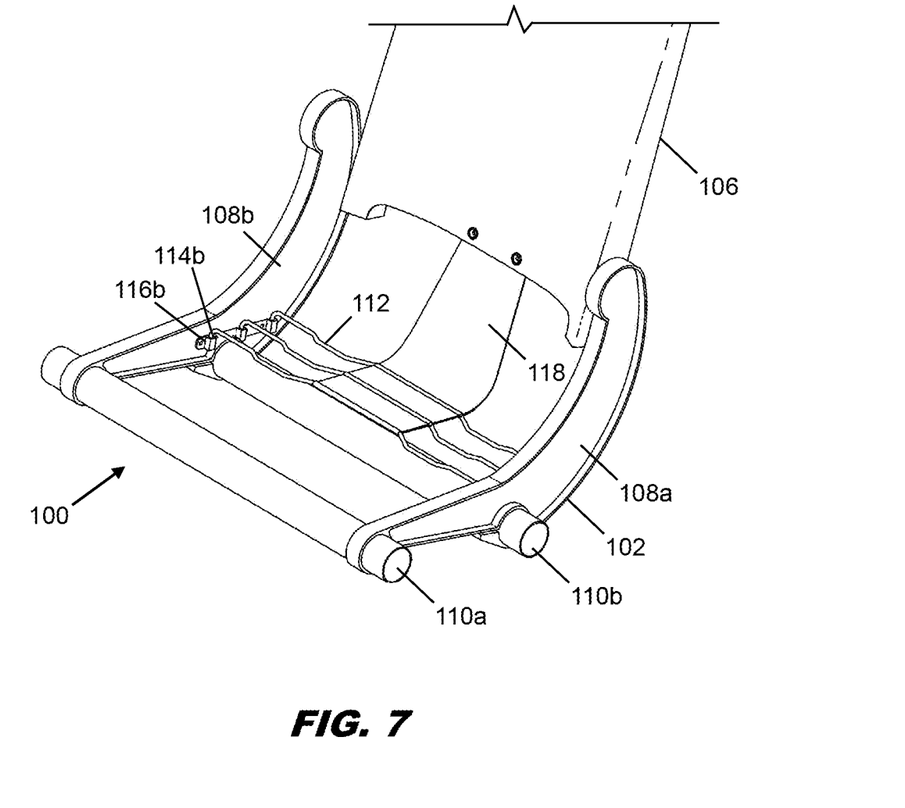
FIG. 7 is a front isometric view of the seat assembly of FIG. 1 shown without the cushion assembly to illustrate a second spring configuration.
Figure 8:
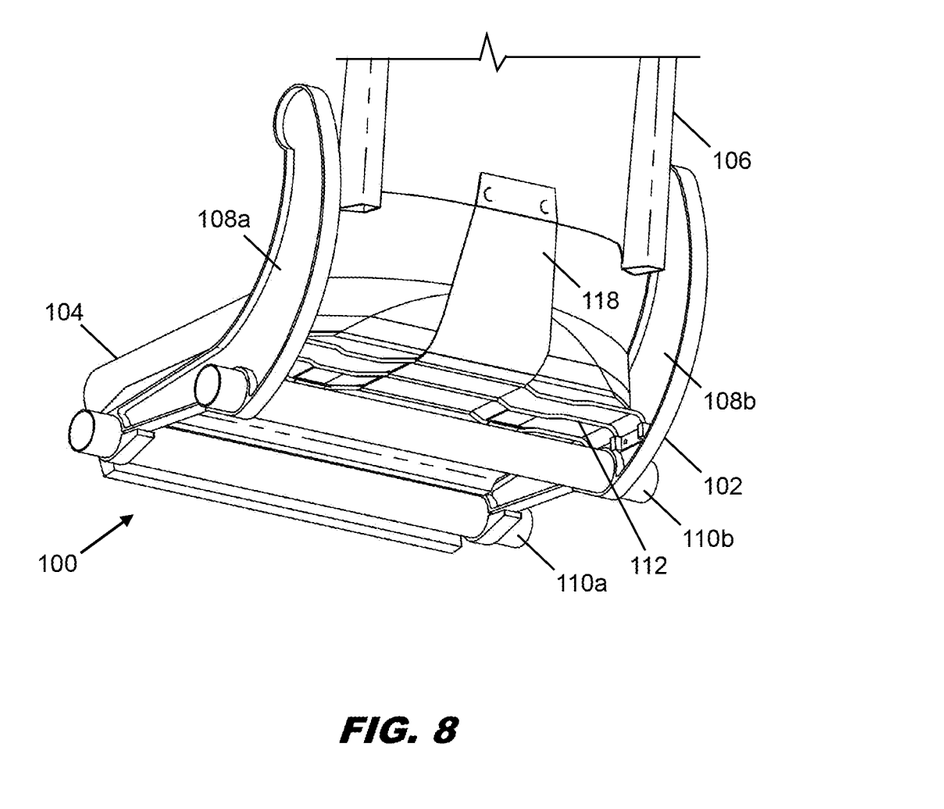
FIG. 8 is a rear perspective view of the seat assembly of FIG. 1 including the second spring configuration.
Figure 9:
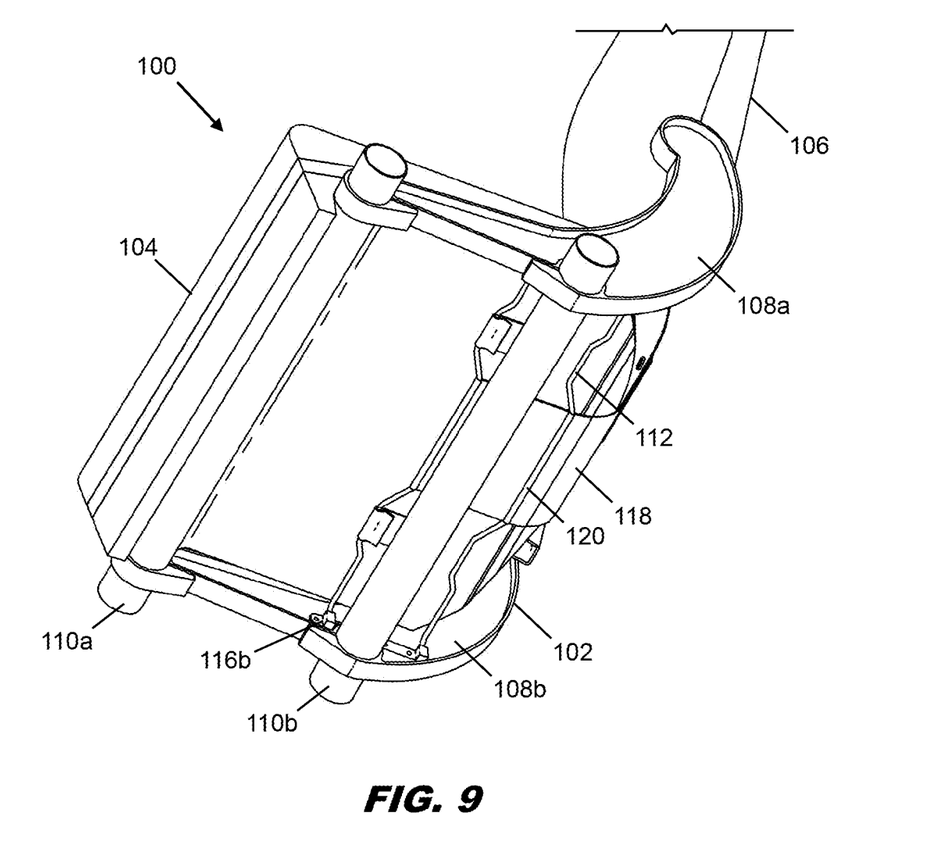
FIG. 9 is a bottom isometric view of the seat assembly of FIG. 1 including the second spring configuration.

FIGS. 7-9 illustrate another embodiment of the seat assembly 100. This second embodiment includes the same seat frame 102, cushion assembly 104, and support member 118 as the first embodiment described above and therefore the descriptions of these elements are not repeated. This second embodiment differs from the first embodiment in terms of the configuration of the springs 112, and more particularly, the manner in which the springs 112 are mounted and restrained. Whereas the first and second end portions 114a, 114b of the springs 112 of the first embodiment face toward the forward end of the seat frame, the first and second end portions 114a, 114b of the second embodiment face downward, thereby providing a different spring orientation and consequential spring performance and feel. Further, whereas the plurality of each of the first and second support members 116a, 116b according to the first embodiment are provided as individual support members each including a substantially horizontal opening, in some embodiments, the first and second support members 116a, 116b according to the second embodiment can each be provided as a single support member including a plurality of substantially vertical openings. In other words, whereas the non-limiting example shown in FIGS. 1-5 includes six separate support members in total, the example shown in FIGS. 7-9 includes two larger support members in total.

Figure 10:
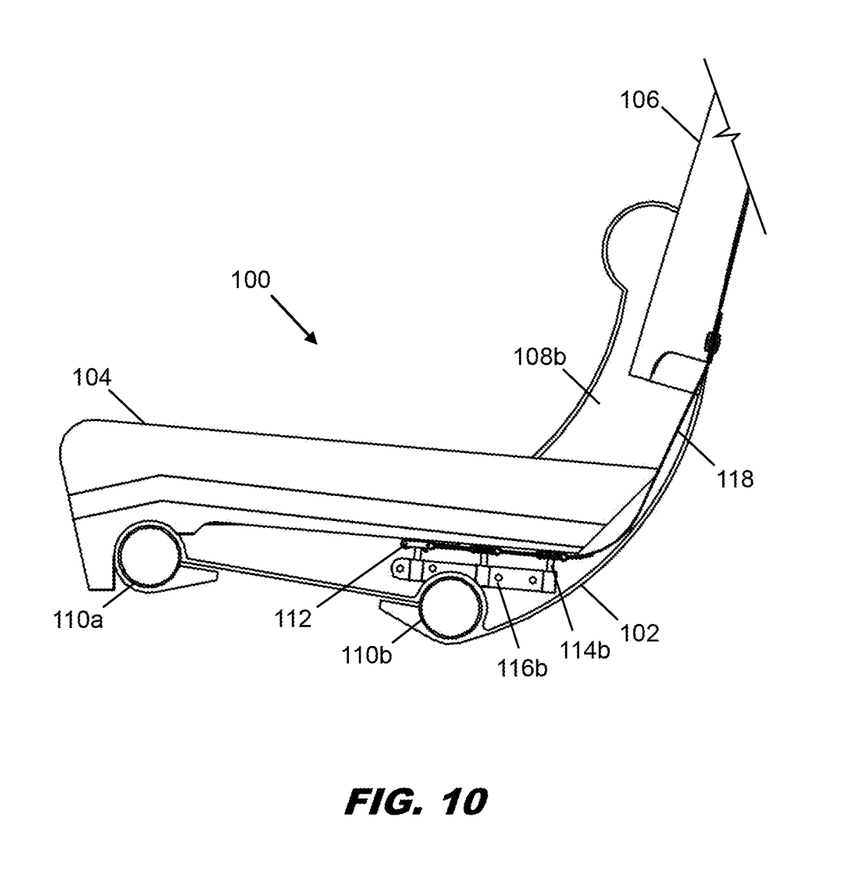
FIG. 10 is an elevation view of the seat assembly of FIG. 1 including the second spring configuration and without the second frame member.

Referring to FIG. 10, and according each of the first or second embodiments, in use the springs 112 positioned proximate the aft end of the seat frame 102 allow the cushion assembly 104 to deflect downward toward the second transverse beam 110b (e.g., aft beam) while the forward end of the cushion assembly 104 simultaneously rotates around the first transverse beam 110a (e.g., forward beam). By resting the forward end of the cushion assembly 104 in the first transverse beam 110a as opposed to springs or a spring structure, the seat assemblies disclosed herein obviate the need for springs positioned at or near the forward end of the seat frame 112, thereby simplifying the seat complexity, reducing weight, simplifying cushion assembly installation and replacement, and improving sitting comfort and life expectancy as compared to conventional seat assemblies including full spring-based supports.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A seat assembly, comprising:
   a seat frame including first and second spaced frame members, and first and second spaced transverse beams spanning between the first and second frame members;
   a plurality of springs positioned proximate an aft end of the seat frame generally above the second transverse beam, the plurality of springs spanning between the first and second frame members;
   a support member attached to the plurality of springs and to the second transverse beam, and the support member attachable at one end to a seat back attachable to the seat frame; and
   a cushion assembly having a forward end rotatably mounted on the first transverse beam and an aft end mounted on the plurality of springs.

2. The seat assembly according to claim 1, further comprising a first support for attaching a first end portion of each spring to the first frame member and a second support for attaching a second end portion of each spring to the second frame member.

3. The seat assembly according to claim 2, wherein the first and second end portions of each spring extend forward and perpendicular to a direction in which the spring is extensible.

4. The seat assembly according to claim 2, wherein the first and second end portions of each spring extend downward and perpendicular to a direction in which the spring is extensible.

5. The seat assembly according to claim 1, wherein each of the plurality of springs is a flat pattern sinuous spring.

6. The seat assembly according to claim 1, wherein the cushion assembly comprises:
   a bottom layer comprising expanded polypropylene structural foam;
   a middle layer comprising polyethylene foam; and
   a top layer comprising polyurethane foam.

7. The seat assembly according to claim 1, wherein the cushion assembly includes an overhanging portion at its forward end which is positioned forward of the first transverse beam.

8. The seat assembly according to claim 1, wherein the cushion assembly is free of attachment to each of the first frame member, the second frame member, and the second transverse beam.

9. An aircraft passenger seat assembly, comprising:
   a seat frame including first and second spaced frame members, and first and second spaced transverse beams spanning between the first and second spaced frame members;
   a seat back pivotally attached to the seat frame;
   a plurality of springs positioned proximate an aft end of the seat frame generally above the second transverse beam, the plurality of springs spanning between the first and second frame members;
   a support member attached at one end to the plurality of springs and at an opposing end to the seat back; and
   a cushion assembly having a forward end rotatably mounted on the first transverse beam and an aft end mounted on the plurality of springs;
   wherein, in use, a load applied on the aft end of the cushion assembly causes the plurality of springs to deflect downward allowing the aft end of the cushion assembly to move toward the second transverse beam and the forward end of the cushion assembly to rotate around the first transverse beam.

10. The aircraft passenger seat assembly according to claim 9, further comprising:
    a first support for attaching a first end portion of each spring to the first frame member; and
    a second support for attaching a second end portion of each spring to the second frame member;
    wherein the first and second end portions of each spring extend perpendicular to a direction in which the spring is extensible.

11. The aircraft passenger seat assembly according to claim 9, wherein the cushion assembly comprises:
    a bottom layer comprising expanded polypropylene structural foam;
    a middle layer comprising polyethylene foam; and
    a top layer comprising polyurethane foam.

12. The aircraft passenger seat assembly according to claim 9, wherein the support member is further attached to the second transverse beam.

13. The aircraft passenger seat assembly according to claim 9, wherein the cushion assembly is free of attachment to each of the first frame member, the second frame member, and the second transverse beam.

* * * * *